(12) United States Patent
Savoie

(10) Patent No.: US 6,397,499 B1
(45) Date of Patent: *Jun. 4, 2002

(54) QUICK RELEASE CLEAT SYSTEM

(75) Inventor: Armand J. Savoie, Gardner, MA (US)

(73) Assignee: MacNeill Engineering Company, Inc., Marlborough, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/669,282

(22) Filed: Sep. 26, 2000

Related U.S. Application Data

(60) Division of application No. 09/062,037, filed on Apr. 17, 1998, now Pat. No. 6,151,805, which is a continuation-in-part of application No. 08/774,585, filed on Dec. 23, 1996, now Pat. No. 5,768,809
(60) Provisional application No. 60/010,099, filed on Jan. 17, 1996.

(51) Int. Cl.[7] .................... A43C 15/16; A43C 15/02
(52) U.S. Cl. .................... 36/134; 36/114; 36/67 A; 36/67 D; 36/127
(58) Field of Search .................... 36/134, 116, 114, 36/67 R, 67 A, 67 D, 62, 66, 59 R, 126, 127, 128, 131; 24/590, 591; 403/348, 356; 215/332; 220/297, 298, 300, 301, 302

(56) References Cited

U.S. PATENT DOCUMENTS

| | | | | |
|---|---|---|---|---|
| 1,758,408 A | * | 5/1930 | Pierce et al. | 36/67 D |
| 3,267,593 A | * | 8/1966 | Turner | 36/67 D |
| 4,492,047 A | * | 1/1985 | Arff | 36/134 |
| 4,667,422 A | * | 5/1987 | Yamaguchi | 36/67 A |
| 5,036,606 A | * | 8/1991 | Erich et al. | 36/134 |
| 5,123,184 A | * | 6/1992 | Ferreira | 36/134 |
| 5,321,901 A | * | 6/1994 | Kelly | 36/134 |
| 5,524,367 A | * | 6/1996 | Ferreira et al. | 36/134 |
| 5,628,129 A | * | 5/1997 | Kilgore et al. | 36/134 |
| 5,655,317 A | * | 8/1997 | Grant | 36/134 |
| 5,768,809 A | * | 6/1998 | Savoie | 36/134 |
| 6,161,315 A | * | 12/2000 | Dalton | 36/134 |

FOREIGN PATENT DOCUMENTS

WO  WO 91/1513  * 10/1991  .................... 36/134

* cited by examiner

*Primary Examiner*—Anthony Stashick
(74) *Attorney, Agent, or Firm*—Bromberg & Sunstein LLP

(57) ABSTRACT

A removably attachable traction gear for the underside of footwear having two primary components: a retaining member and a receptacle. These two components respectively replace the common screw and threaded receptacle systems found in for affixing traction gear to the underside of shoes. A partial turn of the traction gear securely locks the gear into the receptacle. The retaining member has a three-extension design so as to make the traction gear resistant to lateral forces applied to the ground-engaging end of the cleat. Locking is achieved through use of cantilevered fingers which press in during installation of the retaining member, and which spring back out to lock with mated indentations in the extensions. During installation a dome containing insole material is compressed. Unlocking is achieved through reverse turning the retaining member to force the springs back in, and removal is aided through re-expansion of the dome. In a preferred form, the invention is utilized to attach a golf cleat to a shoe.

9 Claims, 14 Drawing Sheets

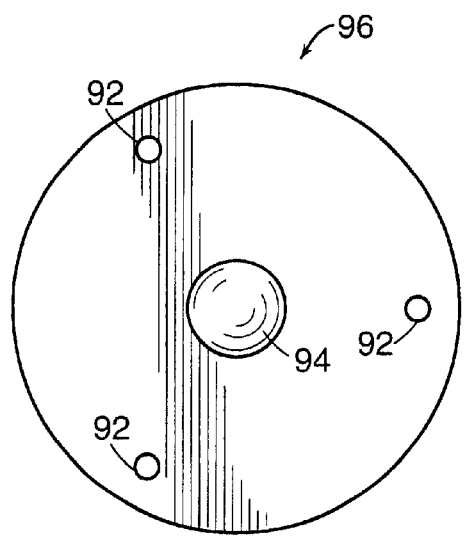
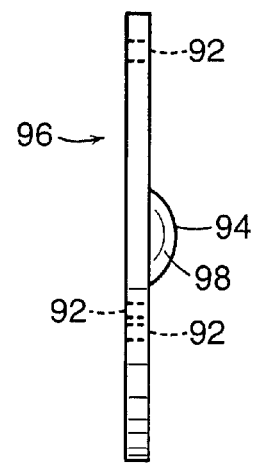
FIG. 14  FIG. 15
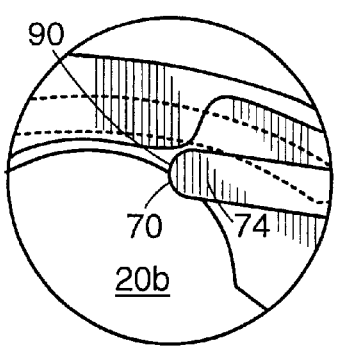
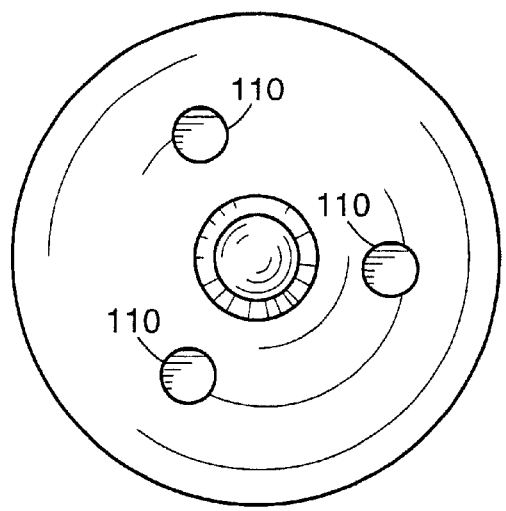
FIG. 16  FIG. 17

QUICK RELEASE CLEAT SYSTEM

DESCRIPTION

The present application is divisional of application Ser. No. 09/062,037, filed Apr. 17, 1998, now U.S. Pat. No. 6,151,805 which is a continuation-in-part of application Ser. No. 08/774,585, filed Dec. 23, 1996, now U.S. Pat. No. 5,768,809 which in turn claims priority from provisional application serial No. 60/010,099, filed Jan. 17, 1996, and titled "Quick-Release Spike for Footwear." These applications are incorporated herein by reference.

FIELD OF THE INVENTION

This invention relates to the mounting of traction gear on the bottom of footwear, in particular, athletic footwear.

BACKGROUND ART

Conventional traction gear presently in use employ an attachment means consisting of screwing the traction gear into the mated receiving receptacle in the bottom of the footwear. Using this screw-type attachment method is especially laborious when one takes into account that a typical golf shoe, for instance, has eleven cleats; as a result, replacing the cleats on a pair of golf shoes entails unscrewing twenty-two cleats and screwing on twenty-two cleats, where each act of unscrewing or screwing entails several turns, typically two and one-half times, for each cleat.

An example of a typical prior-art cleat is in U.S. Pat. No. 4,723,366 (hereinafter the '366 cleat), which patent is incorporated herein by reference. This patent describes a cleat which includes a metal stud infrastructure at the core of the cleat, the infrastructure having a vertical axis and two ends, a screw portion at a first end for engagement with a receptacle within a shoe, a ground end for tractive engagement with the ground, and a broad flange between the screw and head portions and extending radially outward from the vertical axis; a plastic skirt is molded directly upon the flange portion to form a unitary reinforced radial support member of the cleat. Installation of the '366 cleat consists of screwing it into a mated receptacle in the bottom of athletic footwear.

Although some prior-art references show cleat-attachment systems that require less than a full turn, or they require a snap-on arrangement to lock the cleat in place, it appears none of these systems have found wide acceptance amongst users because of shortcomings in stability, ease-of-use, receptacle size and ease-of-manufacture. For instance, in U.S. Pat. No. 4,633,600 to Dassler, a cleat attachment system is disclosed in which a snap ring socket is utilized to affix a cleat to the bottom of a shoe.

In U.S. Pat. No. 3,267,593 to Turner, a cleat attachment system is disclosed wherein the top of the cleat spike has two extensions forming a rough T-shape out of the spike, where the spike is inserted into a mated receptacle having two grooves to receive the extensions. Upon complete insertion of the spike into a receptacle, the spike is turned until the extensions drop into receiving grooves at the top of the receptacle; a retaining ring is then slid onto the mid-section of the spike, this ring apparently preventing the spike from unseating the extensions from the grooves.

Similarly, in German Patent Application Nos. DE3134817A1 to Sportartikelfabrik Karl Uhl GmbH, and DE3423363A1 to Gebrüder Goldschmidt Baubeschläge GmbH, another T-spike design is disclosed in which internal to the mated receptacle are ramping means for engaging and retaining the spike extensions. In the former, a rough interior surface catches the extensions, while in the latter, a sloping interior engages the extensions.

U.S. Pat. No. 4,492,047 to Arff, discloses another T-shape spike in which the skirt is deformed during insertion. Insertion of the spike causes the extensions to go up a ramp and then down a ramp, pulling the spike into the receptacle, and leaving the extensions in a holding area. The skirt is deformed so as to result in a pressure against the socket, the pressure apparently holding the spike from accidentally traveling back up the ramp towards removal.

In U.S. Pat. No. 4,035,934 to Hrivnak, another T-shape spike is disclosed in which the spike column has two indentations. During installation, two spring arms, each positioned perpendicular to the surface of the shoe and parallel to the spike, are pressed in during insertion of the spike, and spring back out to press against the indentations upon complete insertion. Removal of this spike is achieved with a U-shaped tool which slides into the spike receptacle and pushes in the spring arms, thus freeing the spike for removal.

SUMMARY

The present invention provides a system for removably attaching traction gear to the underside of footwear. This system includes two primary components: a retaining member and a receptacle. In a preferred embodiment of the invention, these two components respectively replace the common screw and threaded receptacle system for affixing traction gear to the underside of shoes, providing a faster and simpler attachment of the cleat. Only a partial turn of about 60 degrees of the traction gear securely locks the gear into the receptacle. The three-extension design of a preferred embodiment of the invention makes the traction gear resistant to lateral forces applied to the ground-engaging end of the cleat. Although one embodiment of the invention is a skirted spike utilizing the attachment system for attachment to a golf shoe, other types of traction gear, such as that for rock climbing, may employ the same attachment system.

The present invention employs a three-extension quick-release system for attaching cleats to footwear, instead of the conventional screw method, snap-ring, or T-shaped retaining member of prior-art cleats; with the quick-release system, one can place a cleat into a receptacle in the bottom of a shoe, and simply give the cleat a partial turn to lock it into place for use. (References herein and within the claims that follow to the "top" and "bottom" respectively refer to the end nearer the wearer's foot, and the end nearer the ground.)

A cleat according to the present invention includes a base, preferably made of metal and/or plastic, where at the bottom of the base is standard traction gear, such as the skirt and spike of a golf cleat, and at the top of the base is additional structure for attaching the traction gear to a shoe. The skirt may extend radially outward beyond the ends of the attaching structure and may include full or partial apertures for receiving a cleat wrench, which may be used to install and remove the cleat. The gripping member may be plastic, metal, or have a metal core with a plastic outer layer. Attachment is achieved through use of several extensions projecting out from the top of the base at right angles to the base. In a preferred embodiment of the invention, three thermoplastic extensions are used, all of which are in the same plane, and each extension is equidistant from adjacent extensions. Each extension has a front side and a back side, each of which is substantially parallel to a radial midline of the extension, with the back side defining an indentation which may be L-shaped. If a cleat using this invention were turned upside down, i.e. ground tip up, it would appear that the cleat was standing on a roughly triangular base formed of the three extensions.

To use the invention, an athletic shoe would contain receptacles in the bottom of the shoe designed to receive the cleat. Each receptacle has a wall defining a cavity between a receptacle top and a receptacle bottom, a restraining means attached to the receptacle bottom and extending into the cavity so as to prevent downward movement of an installed cleat, stopping means within the cavity to engage a front side of an extension and prevent the extension from rotating past the stopping means, and a plurality of protuberances within the cavity to engage a back side of an extension and resist rotation of the extension past the protuberance. A cleat inserted into the cavity may be rotated so that the front side of an extension compresses a protuberance to allow the extension to rotate past the protuberance until the front side of the extension contacts a stopping means and the protuberance snugly engages the back side of the extension. In a preferred embodiment, the protuberances are in substantially the same plane as the extension. In a preferred embodiment, the restraining means may include a lip formed at the bottom of the restraining means, against which an outer edge of a top surface of the cleat may overlap in a keyed fashion.

In addition, to ensure a tight fit, and to help prevent dirt and grime from getting inside the receptacle, the extensions and receptacle are preferably designed so that as a cleat is turned within a receptacle, the space for the extension gets tighter, thus compressing the extensions during installation. In a preferred embodiment, this tightening may be accomplished by a taper on the front side of the radial ends of the extensions. The protuberances may be shaped so as to permit turning the cleat with significantly less force during installation than is required for removal. In addition, located at the top of the receptacle may be a resilient bubble partially filling the receptacle, this bubble has a certain resiliency or elasticity, such that the bubble is compressed during insertion of the cleat within the receptacle. When the cleat locks into place, the tight fit and use of three extensions within a receptacle, in addition to the downward pressure from the compressed bubble, renders the cleat very stable.

Removal of the cleat is achieved by simply turning the cleat in the opposite direction of installation. The compressed bubble then aids removal of the cleat, and the expansion of the bubble during removal helps eject the spike from the receptacle. The preferred design of the locking mechanism is such that it takes much more force to turn against the lock than it took to install a cleat.

In a preferred embodiment, a cleat using this system is made out of plastic with internal metal reinforcement; an all-metal design, or a design using resin or another tough material, may be used. Some materials that may be used to form traction gear according to the present invention include but are not limited to thermoplastic materials such as Stanyl Nylon 46, Dupont Acetal Resin 100ST, Technyl A216, Noryl GTX 810, Noryl GTX 820, Polyurethane S74D, Polyurethane 90A, Nylon 6, Nylon 6/6, and Rython. In the present invention, use of such materials to form the extensions with a metal core in the base is preferred as this design allows for extensions that are actually bigger than the space for them inside the receptacle, so that installing a cleat compresses and squeezes the extensions so that a very tight fit results.

Other preferred embodiments include a sole of a shoe having at least one receptacle as described above. Another related embodiment comprises a method of manufacturing such a receptacle for instance by producing the receptacle on a horizontal press.

A preferred embodiment is also directed to a method of installing a removable cleat to the sole of a shoe. In such an embodiment, the method includes providing a cleat having a gripping member for engaging the ground and a retaining means for removably attaching the cleat to the footwear, the retaining means having a vertical axis, a base to which the top of the gripping member is attached, and at least three extensions attached to the base, wherein each extension projects radially outward from the base in a direction substantially perpendicular to the vertical axis, and wherein each extension has a front side and a back side, each side substantially parallel to a radial midline of the extension, the back side defining an indentation. A preferred embodiment continues by providing a receptacle for receiving and holding the cleat, the receptacle being mounted in the sole of a shoe, the receptacle having a wall defining a cavity between a receptacle top and a receptacle bottom, a restraining means attached to the receptacle bottom and extending into the cavity so as to prevent downward movement of an installed cleat, stopping means within the cavity to engage a front side of an extension and prevent the extension from rotating past the stopping means, and a plurality of protuberances within the cavity to engage a back side of an extension and resist rotation of the extension past the protuberance. A cleat inserted into the cavity may be rotated so that the front side of an extension compresses a protuberance to allow the extension to rotate past the protuberance until the front side of the extension contacts a stopping means and the protuberance snugly engages the back side of the extension. The method continues with inserting the cleat's extensions into the receptacle's cavity and rotating the cleat until the cleat reaches a locked position.

BRIEF DESCRIPTION OF THE DRAWINGS

The following drawings are intended to provide a better understanding of the present invention, but they are in no way intended to limit the scope of the invention.

FIG. 14 is a bottom view of a cover for the FIG. 12A receptacle.

FIG. 15 is a side view of FIG. 14 cover.

FIG. 16 is a partial view of a FIG. 9A cleat inserted into a FIG. 12A receptacle.

FIG. 17 is a bottom view of the FIG. 9A cleat.

DESCRIPTION OF PREFERRED EMBODIMENTS OF THE INVENTION

Figure 1:
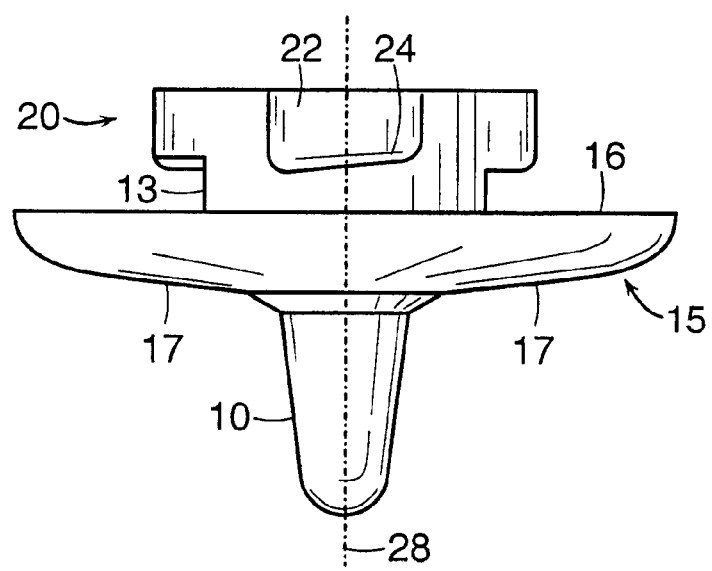
FIG. 1 is a side view of a cleat according to one embodiment of the invention.

The invention comprises a system for allowing the quick attachment and release of a wide variety of traction gear. FIG. 1 shows that in one embodiment of the invention, the attachment system would be used to attach cleats, such as those disclosed in U.S. Pat. No. 4,723,366, to the underside of athletic footwear a cleat installed in the bottom of a shoe using the present invention, when viewed from the bottom, has a similar appearance to the preferred embodiment of the invention disclosed herein. Evident in FIG. 1 are the bottom side 17 and top side 16 of the plastic skirt 15, the ground-engaging head portion 10 of the cleat, a base 13 to which the plastic skirt and ground-engaging portion are attached and a retaining member 20, which in this case is a base 13 with three rounded extensions 22, all of which are positioned around a central axis 28. In a preferred embodiment of the invention, the top 16 of the skirt 15 is slightly concave, and the bottom 17 of the skirt 15 is somewhat convex.

Figure 2:
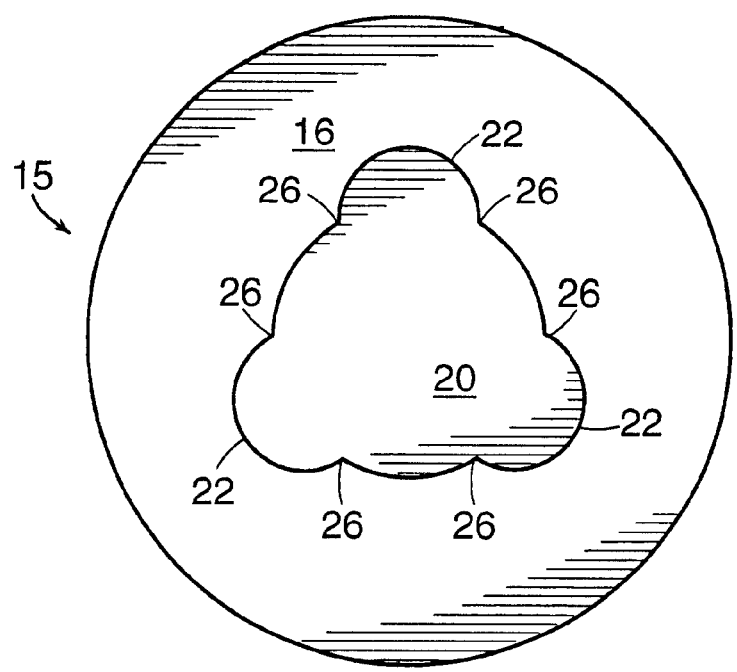
FIG. 2 is a top view of the cleat of FIG. 1, showing the shape of the lobes to be inserted into a mated receptacle in the bottom of athletic footwear.
Figure 5:
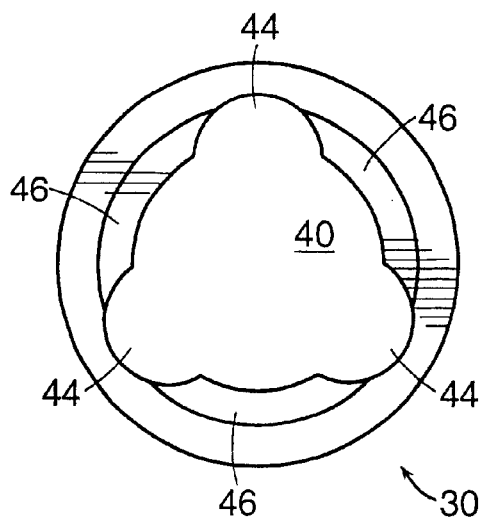
FIG. 5 is a bottom view of a receptacle that may receive the FIG. 1 cleat.
Figure 6:
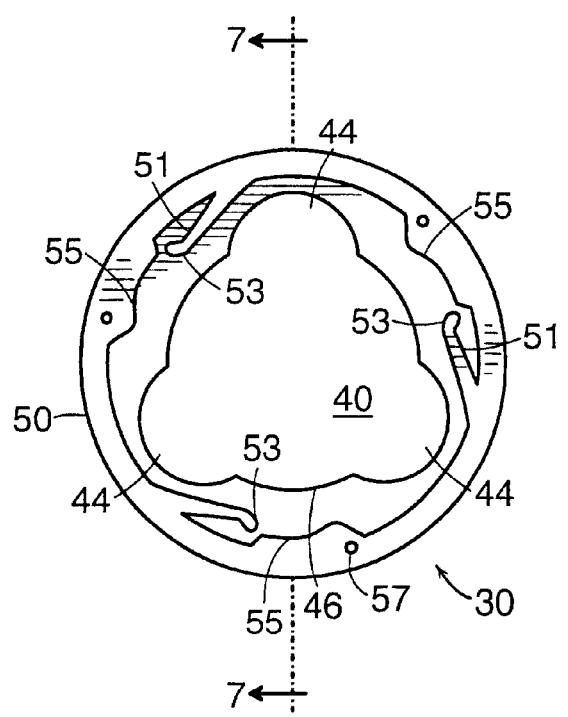
FIG. 6 is a top section view of the FIG. 5 receptacle wherein the top layer of the receptacle has been removed.

FIG. 2 shows the topside 16 of the cleat skirt 15 and the retaining member 20, which has a roughly triangular shape with indentations 26. The extensions 22 of the retaining member 20 are used in conjunction with components inside the receptacle, shown as item 30 in FIG. 5, for locking in place a properly inserted retaining member 20. Locking in place occurs after inserting the retaining member 20 into a mated receptacle opening 40 as shown in FIG. 5 and FIG. 6, and torquing the retaining member. The extensions 22 are attached to the base 13 (shown in FIG. 1), and together the extensions and the base form the retaining member 20. In a preferred embodiment of the invention, a completed cleat, comprising the retaining member 20 and traction gear, is made out of plastic with a metal core used to reinforce the structure. Although the invention could be made entirely out of metal, it is preferable that the cleat be made partially of plastic and partially of metal. When the retaining member is plastic, the retaining member may be integrally formed with a plastic skirt of a golf cleat with a core, preferably metal, extending through the retaining member and the traction gear to form the ground-engaging head portion 10 shown in FIG. 1.

In a preferred embodiment of the invention, upon insertion of the retaining member 20 into a receptacle, the angled surface 24 (shown in FIG. 1) of the extensions 22 allows for a tighter fit of the retaining member 20 into the receptacle 40 (shown in FIG. 5). The tight connection not only serves to give a stable connection between the shoe and traction gear, but also serves to keep moisture and debris out of the attachment system.

Figure 3:
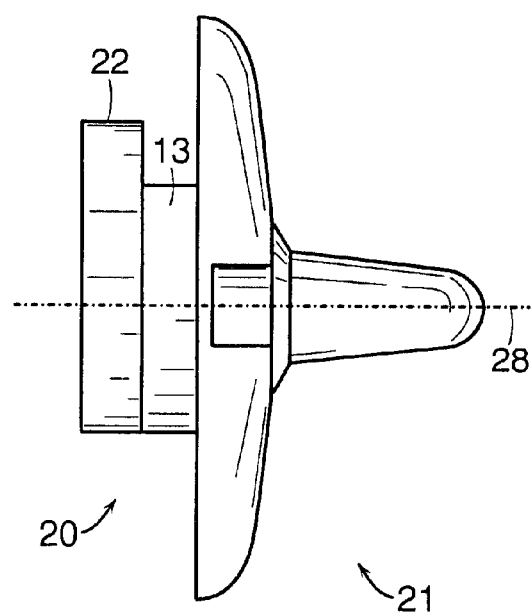
FIG. 3 is another side view of the cleat of FIG. 1.

FIG. 3 is another view showing the structure and proportion of the retaining member 20 as attached to traction gear 21. FIGS. 2 and 3 show that in a preferred embodiment of the invention, the extensions 22 form a broad retaining member 20, and the base 13 is cylindrical and concentrically disposed around the center axis 28; the base 13 is attached to the extensions 22 and the traction gear 21.

Figure 4:
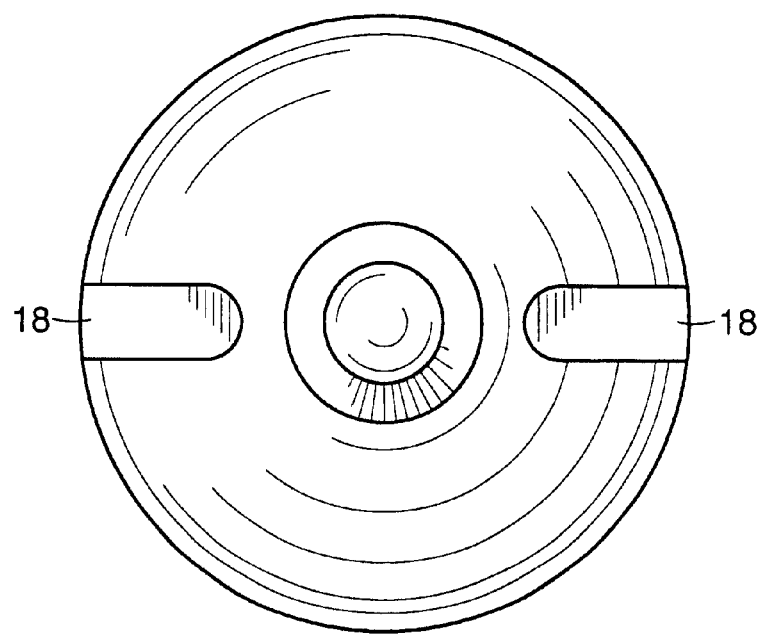
FIG. 4 is a bottom view of the cleat of FIG. 1.

FIG. 4, a bottom view of the FIG. 1 cleat, shows that, in a preferred embodiment of the invention, cleats do not have to be redesigned beyond modifying the retaining member 20 (shown in FIG. 1), and that conventional cleat designs are intended to be used in conjunction with the new retaining member; once a cleat is installed, the change in the retaining system is not apparent. A standard golf-cleat wrench may be used to engage the traction gear through use of the wrench holes 18.

FIG. 5 is a bottom view of a receptacle 30 that may receive the FIG. 1 cleat, showing the receptacle opening 40, with indentations 44 along its perimeter for accepting the retaining member extensions 22 (shown in FIG. 1). FIG. 5 also shows the ledges 46 that while serving to form the shape of the opening 40, also serve to hold the extensions 22 within the receptacle. Although preferred embodiments of the invention include a single receptacle opening 40, alternate embodiments of the system could have a receptacle with separate openings for receiving extensions.

FIG. 6 is a section view of FIG. 5 where the top layer of the receptacle has been removed to show the inner-cavity structure for receiving the retaining member 20 (shown in FIG. 1). Within the cavity, formed by wall portion 50, there are several cantilevered fingers 51, or spring arms, that are designed to grip and hold an installed retaining member. When a retaining member is inserted into the indentations 44 and twisted, the twisting action causes a protruding edge of an extension 22 (shown in FIG. 1) to push into and bend the finger 51 to allow the extension to be turned past the location of the finger. Once the protruding edge of an extension passes the location of the finger, the finger springs back to nearly its original shape, so that surface 53 rests against the perimeter of the extension 22. This allows the cleat to be removed, but only by exerting sufficient force to bend the finger 51 away from the surface of the extension 22, an arrangement requiring much greater torque than that required during installation of the retaining member. In one embodiment, the fingers are elongated in shape, with surface 53 forming a curved tip to the finger. FIG. 6 also shows bumps 55 which serve as a means for preventing a retaining member from being turned too far. In a preferred embodiment, the cleat should not be turned more than about 60°. Coincident with the fingers 51 locking into place, the protruding edge of an extension is blocked from further movement by the bumps 55, and the entire retaining system is prevented from failing out of the receptacle by ledges 46. FIG. 6 also shows one method of attaching the receptacle to the underside of footwear by the use of mounting holes 57.

Spacing within the receptacle may be designed such that during installation of a cleat, the cavity 40 in which the extension is turned gradually narrows to compress and securely hold the cleat in place. Preferably the spacing is consistent or more gradual than the angled surface, so that the angled surfaces 24 (shown in FIG. 1) of the extension 22 being pressed against the ledges 46 cause the fit to be tight. In addition, having three extensions parallel to the cleat skirt makes for a more secure base for a cleat.

Figure 7:
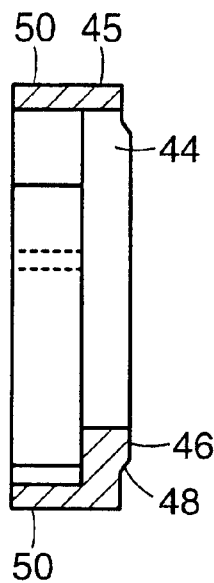
FIG. 7 is a side vertical section of the receptacle of FIG. 6.

FIG. 7 is a vertical section of a portion of the embodiment of the receptacle of FIG. 6. This view shows the ledge 46 formed by the bottom layer 45 of the receptacle and the wall portion 50 that defines the cavity within the receptacle. This view also shows the slight rise 48 which forms a lip at the receptacle opening so that the edge of an installed cleat's skirt may overlay the lip. The lip helps hold the cleat in place and makes it more resistant to lateral forces while the cleat is in use.

Figure 8:
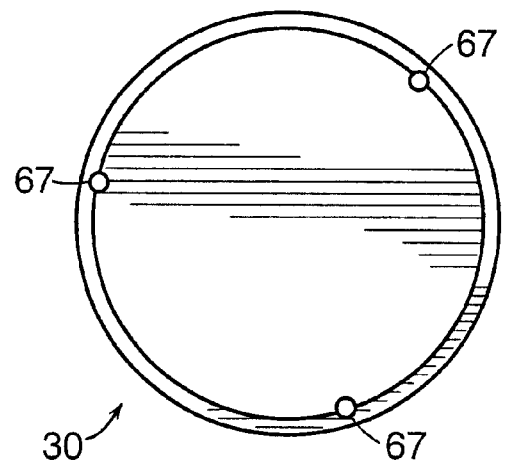
FIG. 8 is a top view of the FIG. 6 receptacle wherein the top layer has not been removed.

FIG. 8, which is the FIG. 6 receptacle where the top layer has not been removed, is a view from the top of the receptacle 30 in accordance with a preferred embodiment of the invention. This view shows the top side 67 of the mounting holes for attaching the receptacle.

Figure 9A:
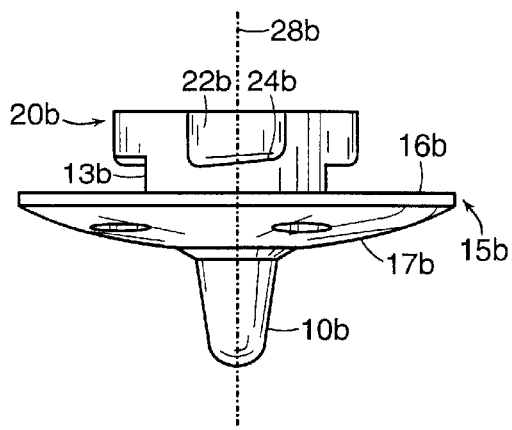
FIG. 9A is a perspective right side view of a cleat according to a preferred embodiment of the invention.
Figure 9B:
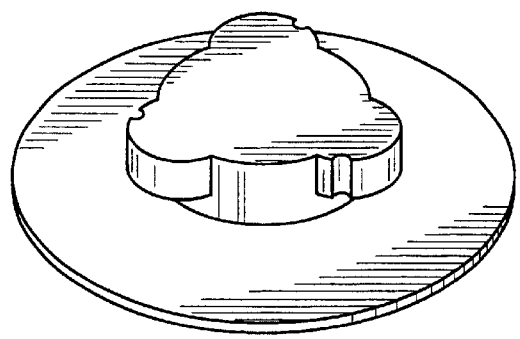
FIG. 9B is a perspective top view of the FIG. 9A cleat.
Figure 9C:
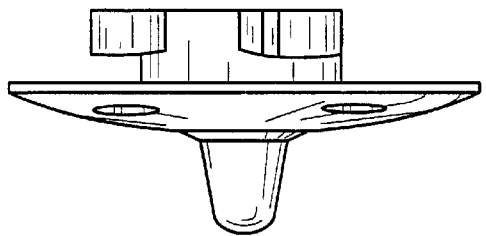
FIG. 9C is a perspective front view of the FIG. 9A cleat.
Figure 9D:
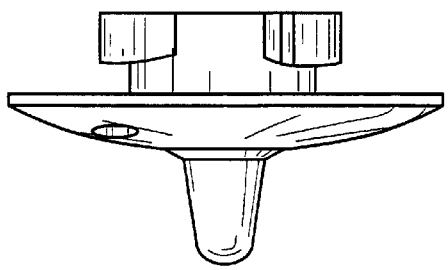
FIG. 9D is a perspective left view of the FIG. 9A cleat.

FIGS. 9A–9D, 10 and 11 show a preferred embodiment of a cleat having the same basic characteristics and structural concerns of the FIGS. 1, 2, and 3 embodiments discussed hereinabove. Evident in FIG. 9A are the bottom side 17b and top side 16b of the plastic skirt 15b, the ground-engaging head portion 10b of the cleat, a base 13b to which the plastic skirt and ground-engaging portion are attached and a retaining member 20b, which in this case is a base 13b with three rounded extensions 22b, the extensions having an angled surface 24b and being positioned around a central axis 28b. FIGS. 9B–9D are respectively the perspective top, front, and left view of the FIG. 9A cleat.

Figure 10:
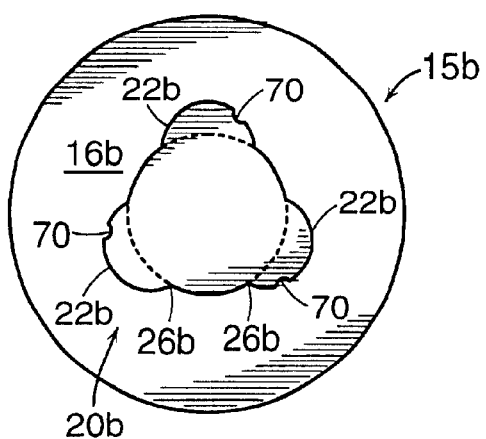
FIG. 10 is a top view of the cleat of FIG. 9A, showing the shape of the lobes to be inserted into a mated receptacle in the bottom of athletic footwear.

Evident in FIG. 10 are the corresponding topside 16b of the cleat skirt 15b and the retaining member 20b, with indentations 26b. The extensions 22b of the retaining member 20b are used in conjunction with components inside the receptacle 84 of FIG. 12A, for locking in place a properly inserted retaining member 20b. Locking in place occurs after inserting the retaining member 20b into a mated receptacle opening 40b shown in FIG. 12A, and torquing the retaining member. As with the FIG. 1 embodiment, upon inserting the retaining member 20b into a receptacle 84, the angled surface 24b (shown in FIG. 9A) of the extensions 22b forces a gradual compression of the retaining member 20b as it is inserted into the receptacle cavity 40b, resulting in a tight connection giving stability while also serving to keep moisture and debris out of the attachment system.

Also evident in the FIG. 10 embodiment is a modification to the FIG. 2 embodiment, where the extensions 22 of FIG. 2 are modified to include an indentation 70 that further enhances the invention's resistivity to unlocking and its unintentional removal through normal use. Increased resistivity is effected by an interlocking of a cantilevered finger 74 (shown in FIG. 16) with the indentation 70. The cantilevered finger 74 corresponds to the cantilevered finger 51 of the FIG. 6 embodiment, in which the cantilevered finger 51 has been thickened to afford a greater resistivity to unintentional unlocking. Further, upon complete insertion of the retaining member 20b into an appropriate receptacle 84 (shown in FIG. 12A), the end portion 90 of the cantilevered finger 74 rests within the indentation 70. Consequently, removal of the cleat requires greater torque than that required to install the cleat.

Figure 11:
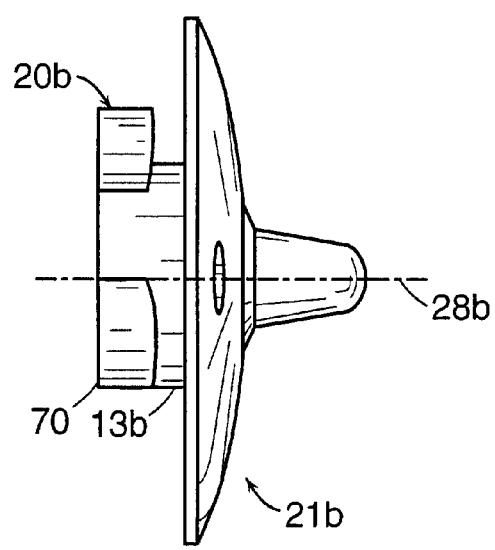
FIG. 11 is another side view of the cleat of FIG. 9A.

FIG. 11 is another view showing the structure and proportion of the retaining member 20b as attached to traction gear 21b, indicating the location of indentation 70, as well as showing that the placement of the retaining member 20b and base 13b is concentrically disposed around the center axis 28b.

Figure 12A:
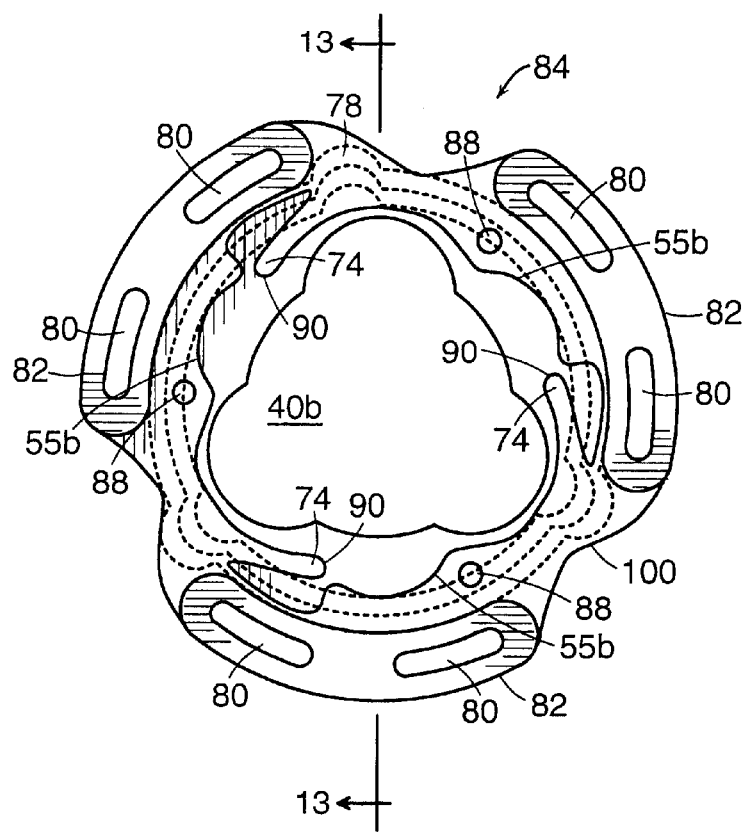
FIG. 12A is a top section view of a the receptacle for receiving the cleat of FIG. 9A, wherein the top layer of the receptacle has been removed.
Figure 12B:
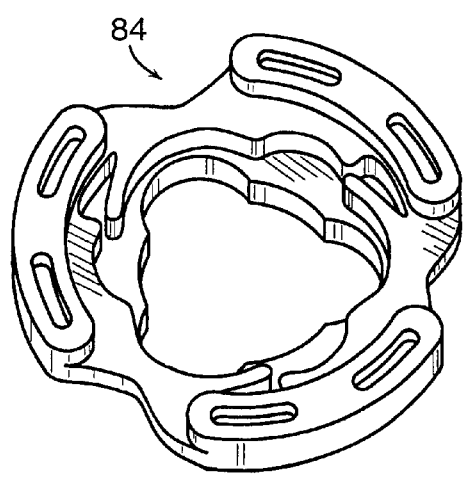
FIG. 12B is a perspective bottom view of the FIG. 12A receptacle.

FIG. 12A is a section view of a preferred embodiment of a receptacle for receiving the cleat of FIGS. 9A–9D, 10 and 11, where the top layer of the receptacle 84 has been removed to show the inner-cavity structure for receiving the retaining member 20b (shown in FIG. 9A). FIG. 12B shows a perspective view of the FIG. 12A receptacle. As with the FIG. 6 embodiment, included within the cavity, formed by wall portion 78, are several cantilevered fingers 74 designed to grip and hold an installed retaining member 20b. When a retaining member is inserted and twisted, the twisting action causes a protruding edge of an extension 22b to push into and bend the finger 74 to allow the extension to be turned past the location of the finger. Once the protruding edge of an extension passes the location of the finger 74, the finger springs back to nearly its original shape, so that surface 90 contacts the perimeter of the extension 22b. As described hereinabove, when the surface 90 contacts extension 22b, there is an interlocking of cantilevered finger 74 with the indentation 70 (shown in FIG. 10). This allows the cleat to be removed, but only by exerting sufficient force to disengage and bend finger 74 away from indentation 70 and the surface of the extension 22b, an arrangement requiring much greater torque than that required during installation of the retaining member. As with the FIG. 6 embodiment, the fingers are preferably elongated in shape, surface 90 forms a curved tip to the finger, and bumps 55b serve as a means for preventing a retaining member from being turned too far during insertion.

Also evident in the FIG. 12A receptacle is another preferred embodiment for attaching the receptacle 84 to the underside of footwear by the use of a mounting slot 80. In this embodiment, the perimeter 100 of the receptacle 84 comprises three flanges disposed around the receptacle opening 40b. In preferred embodiments, within each flange 82 of the perimeter are two slots 80 for mounting the receptacle 84 to footwear. Mounting of the receptacle is by methods known in the prior art, and may include forming sole material around the slots, or inserting a pin or other object through the slot to effectively nail the receptacle to an inner-sole of a shoe, and then forming the outer-sole material around the receptacle so affixed. The slots 80 are separated by a pre-determined distance and are preferably curved to conform to the curvature of the flange 82 in which the slot 80 is set. Also shown are three openings 88 to allow for attaching a receptacle cover 96 (shown in FIG. 14) to the receptacle 84.

Figure 13:
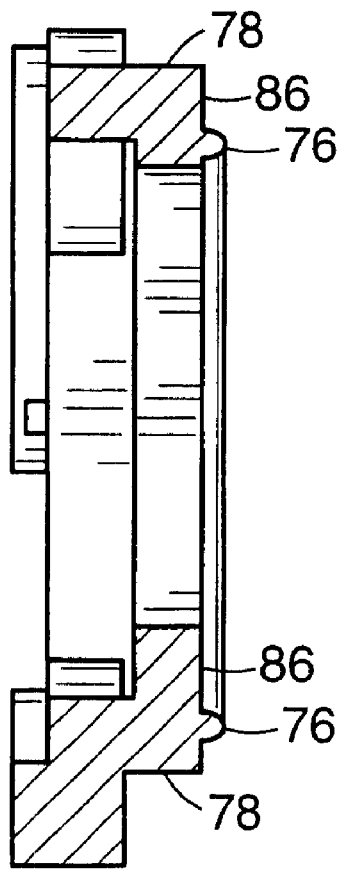
FIG. 13 is a side vertical section of the receptacle of FIG. 12A.

FIG. 13 is a vertical section of a portion of the embodiment of the receptacle of FIG. 12A. The FIG. 13 embodiment has a ridge 76 has been added in the bottom layer 86 of the wall portion 78 of the receptacle. In this preferred embodiment, the ridge 76 is located upon the downward side of the receptacle and helps assure mold seal-off. Sealing off the mold helps prevent sole material from the outsole molding process from accidentally spilling in over the bottom-end of the receptacle during production. (The receptacle and outsole are preferably molded ground-side up.) In addition, by adding ridge 76 to the basic design of FIG. 6, the structure of the FIG. 6 receptacle is strengthened, making it less susceptible to torques, distortions, or other forces. This results in better retention of the receptacle within the sole of athletic footwear.

FIG. 14 shows a receptacle cover 96 having three holes 92 corresponding to the three openings 88 shown in FIG. 12. In preferred embodiments, the receptacle cover is designed to attach to and seal the top end of the receptacle 84 of FIG. 12A, so that during molding of a shoe sole around the receptacle, the sole material does not seep under the top edge of the receptacle and fill its cavity. In addition, at the center of the cover 96 is a dome 94. This dome hangs downward from the top of the receptacle, into the receptacle cavity for receiving a retaining member 20b (shown in FIG. 9A).

FIG. 15 shows a side view of the FIG. 14 cover, indicating the extent of the dome 94 with respect to the rest of the cover's 96 proportions. The dome forms a cavity 98 between a sole of a shoe and the top of the receptacle 84 (shown in FIG. 12A). In preferred embodiments, during manufacture of a shoe sole, in addition to sole material being molded around the receptacles, sole material is also allowed to fill in the cavity 98. Consequently, as a retaining member 20b (shown in FIG. 9A) is inserted into a proper receptacle, the insertion forces a compression of the dome which in turn compresses the sole material filling the dome. The dome 94 serves two purposes. First, when the retaining member 20b of traction gear is fully installed within a receptacle 84 (shown in FIG. 12A), the compression of the dome results in a downward pressure upon the extensions 22b from the dome trying to re-expand into its original shape. Second, when one tries to remove the traction gear from the receptacle 84, the re-expansion of the sole material helps push the retaining member away from the sole, thus aiding in the removal of attached gear.

In preferred embodiments, the extensions for the attachment system are molded using conventional molding processes. Preferably, the molding process uses mold components having expandable cavities, these cavities allowing for undercuts to be molded without the use of side actions or slides. The receptacle may be molded using conventional molding processes, where the receptacles are preferably produced on a horizontal or vertical press and, with the aid of precision mold design and building, are formed in a manner well-known in the art.

In preferred embodiments of the invention, during manufacture, the receptacle portion with the top cover attached is placed in an outsole mold, and the ground surface part of a shoe is then molded. The molding process is preferably one of injection or compression molding. The particular location of each receptacle within the mold depends on the intended use of the shoe and the design of the shoe's shape. During manufacture of the outsole of one embodiment of the invention, mold support-braces may be used to help ensure no deformation of the receptacles during the molding of the sole. Preferably, the support-braces are negatives of the receptacle's shape such that when a brace is inserted into a receptacle, the receptacle 84 and pin holes 88 (shown in FIG. 12A) are temporarily sealed off to prevent sole material from filling in the receptacle cavity 40b and pin holes 88. These pins may also be used to help orient and position the receptacle so that sole material flows up to and not beyond the ridge 76 (shown in FIG. 13) that is visible on the ground side of the receptacle. Once the outsole is molded, a second material may be molded or cemented to the outsole, and also cemented to the upper portion of the shoe. In this embodiment, the outsole and second material combination form a completed sole having the embedded receptacles.

In some embodiments, the shoe sole may be formed of light-weight materials such as EVA or foam. In such embodiments, the sole material may be insufficiently strong to hold a receptacle firmly in place. Consequently, in preferred embodiments, a support plate may be added to the sole structure, wherein the receptacles are attached to the plate at the desired locations, and the sole is formed around the attached receptacles. Such plates may also be used for heel support for footwear having light-weight heels; similarly, for heel-plates, support-pins may also be used to help prevent heel receptacle deformation.

FIG. 16 is a partial view of a FIG. 9A cleat inserted into a FIG. 12A receptacle. Shown is a magnified view of the tip 90 of a cantilevered finger 74 at rest in indentation 70 of retaining member 20b. As described hereinabove, after installation of a cleat into a receptacle, the torque required to dislodge the cantilevered finger 74 from the indentation 70 is much greater than that required during installation.

FIG. 17, a bottom view of the FIG. 9A cleat, shows that in this embodiment of the invention, a three-pronged wrench is inserted into the three wrench holes 110 used to remove the cleat. Use of a three-wrench-hole design gives greater stability during insertion and removal of a cleat, and allows greater torque to be applied, without slipping out of the holes, during such insertion and removal.

Figure 18:
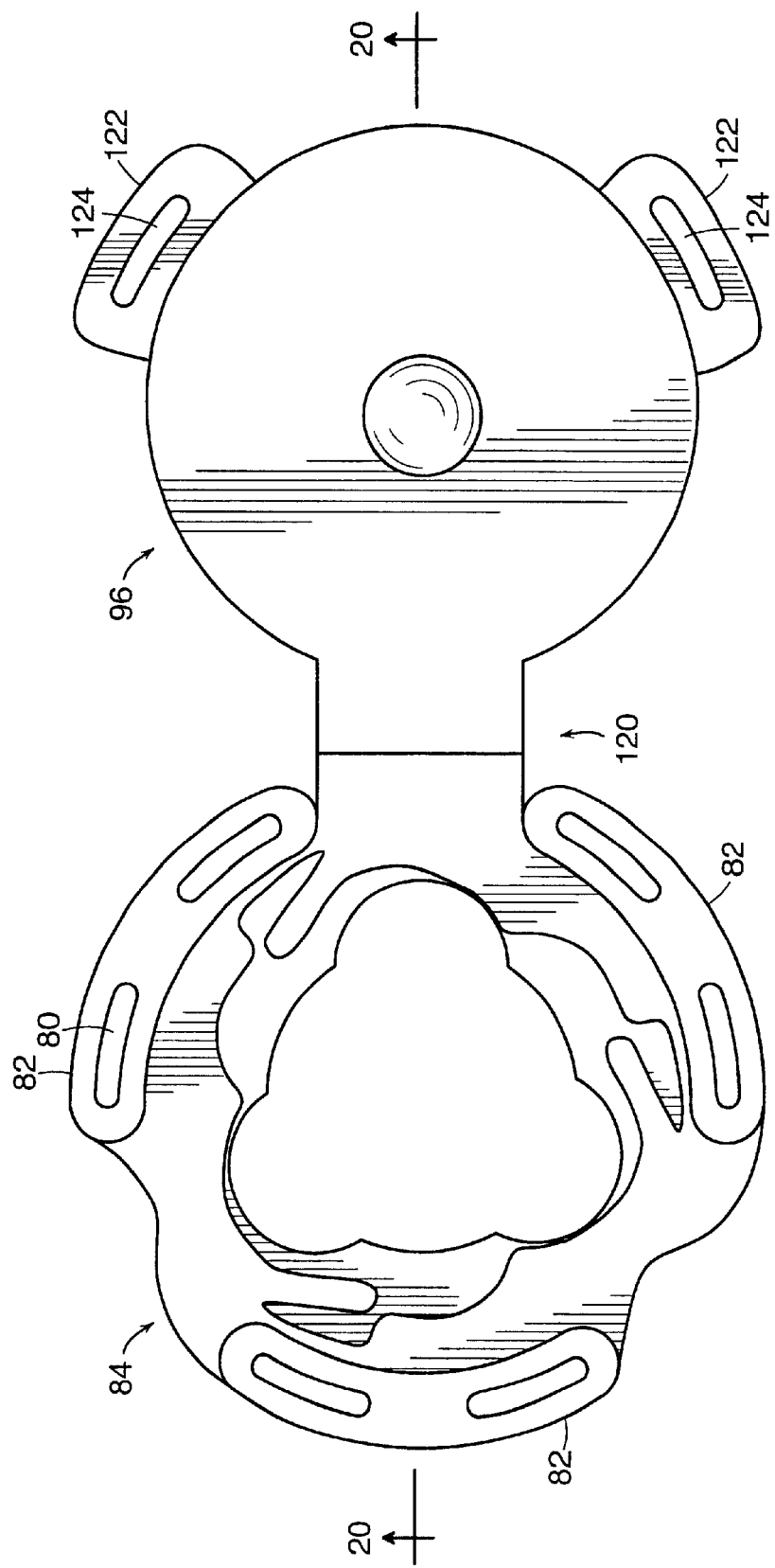
FIG. 18 is a top view of an unassembled receptacle for receiving the FIG. 9A cleat.

FIG. 18 is a top view of an alternate embodiment where a modified FIG. 14 cover is attached to the FIG. 12A receptacle through a flexible attachment region 120. In this embodiment, the receptacle 84 and cover 96 may be integrally formed of a single portion of production material, and simultaneously formed from a single mold. Before insertion of this embodiment of the receptacle into a shoe sole, the cover is flipped closed to cover the top of the receptacle. The FIG. 14 cover is modified to include two cover flanges 122 which, when the cover is closed, rest in-between two of the receptacle flanges 82. The cover flanges 122 also have slots 124, which in addition to the receptacle slots 80 described hereinabove, are used for mounting the FIG. 18 combined receptacle and cover to the underside of footwear.

Figure 19:
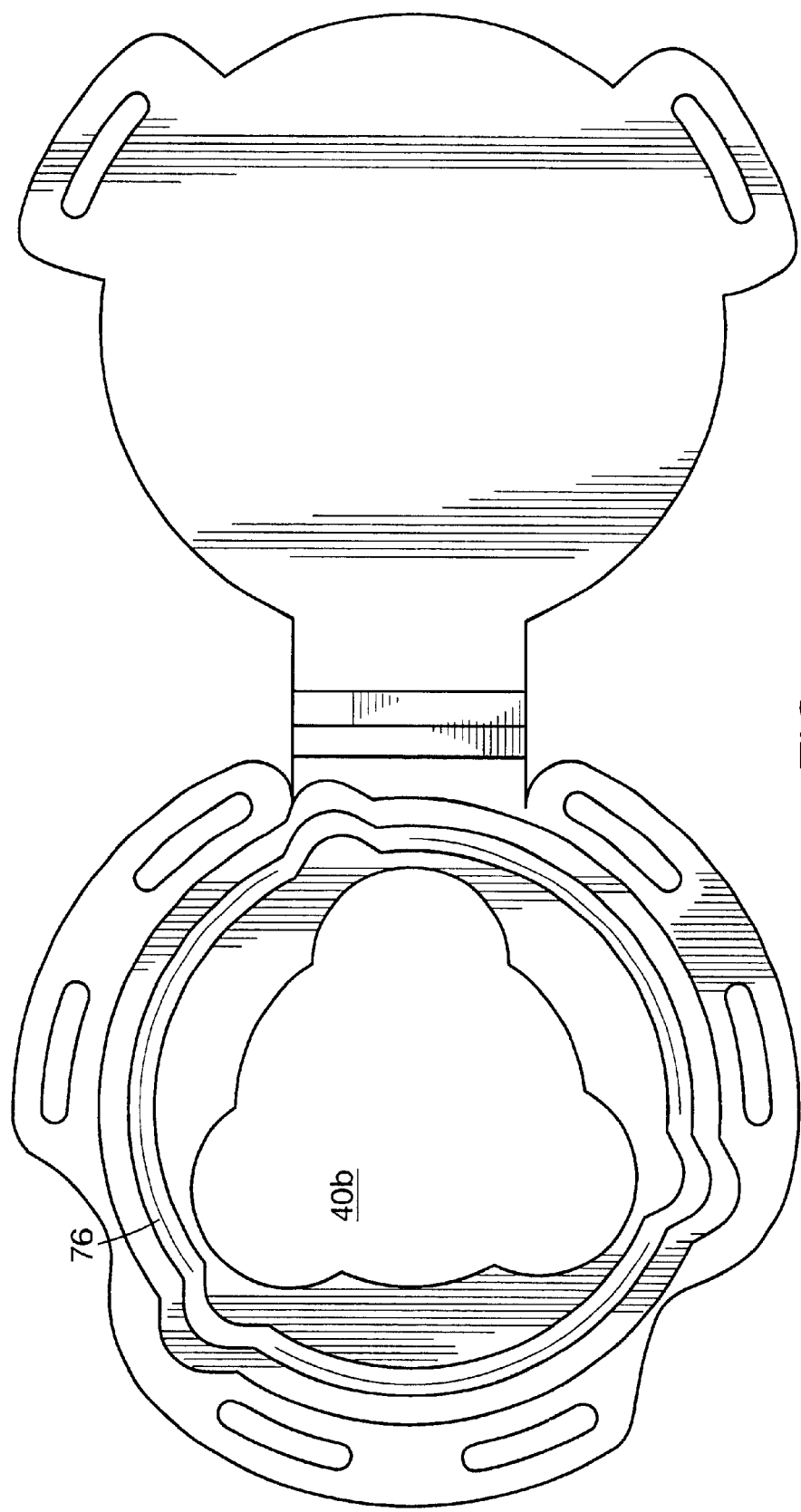
FIG. 19 is a bottom view of the FIG. 18 receptacle.

FIG. 19 is a bottom view of the FIG. 18 embodiment, showing the ridge 76 (see FIG. 13 hereinabove) which helps prevent sole material from the outsole molding process from accidentally spilling in over the bottom-end of the receptacle opening 40b with attached FIG. 14 cover having the features as disclosed hereinabove for FIG. 12A and FIG. 14.

Figure 20:
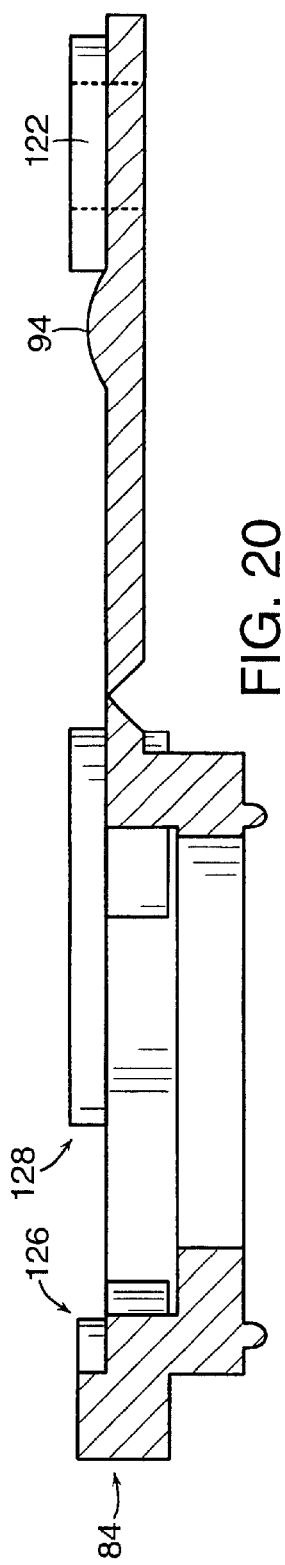
FIG. 20 is a section view of the FIG. 18 receptacle.

FIG. 20 is a top section view of FIG. 18, showing the relationship between the extent of the dome 94.and the receptacle 84. Also shown is the region defined by portions 126, 128 for receiving the cover flange 122 when the cover is closed over the receptacle 84.

Figure 21:
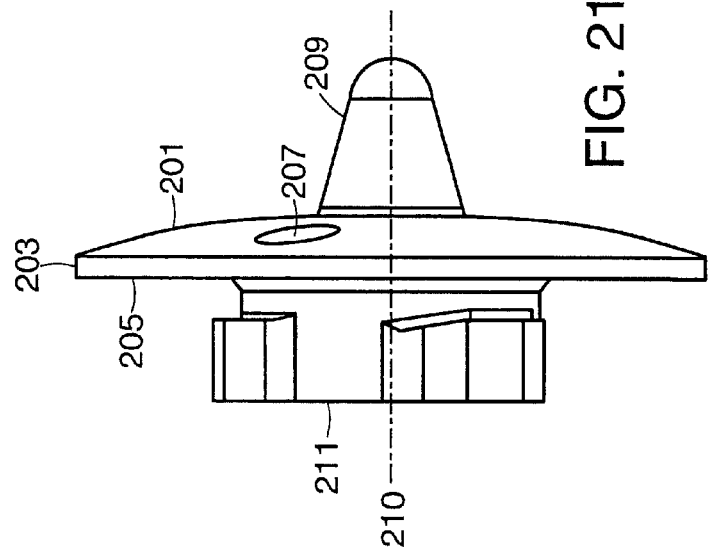
FIG. 21 is a side view of a cleat according to a preferred embodiment of the invention.
Figure 22:
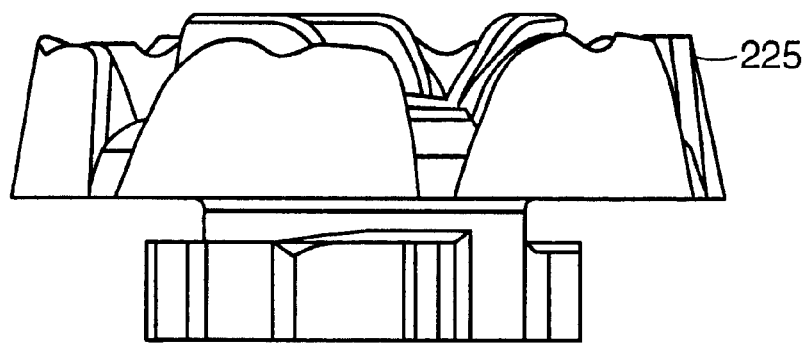
FIG. 22 is a side view of a cleat according to a preferred embodiment of the invention showing an alternative ground-engaging "soft" golf spike.
Figure 23:
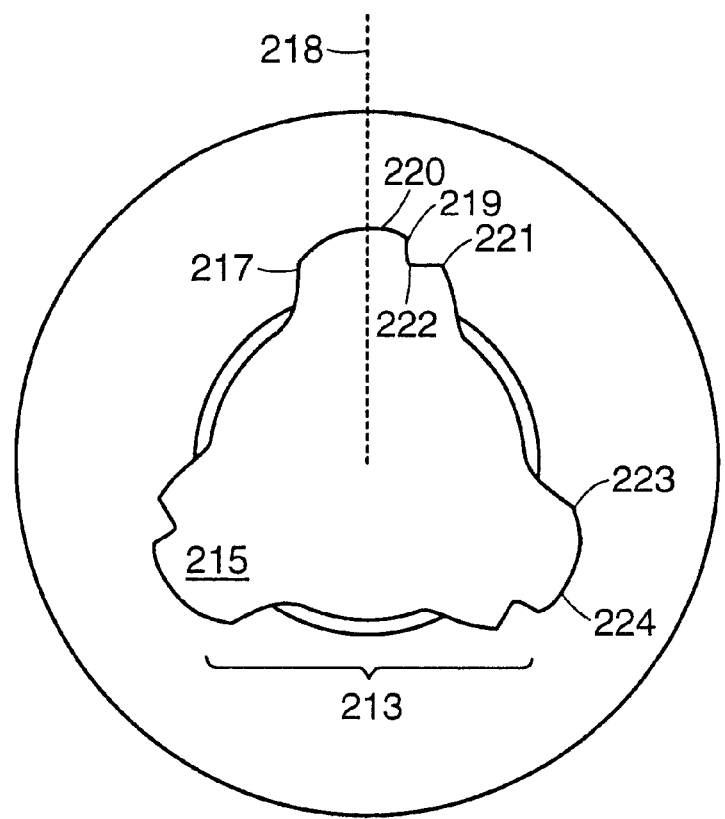
FIG. 23 is a top view of a cleat similar to FIG. 21 showing the top of the cleat connector.

FIG. 21 shows a side view of an alternative embodiment of a cleat having some of the same basic characteristics of the FIGS. 1, 2, and 3 embodiments discussed hereinabove. Evident in FIG. 21 are a bottom 201 of a plastic skirt 203, and a top 205 with receptacles 207 for a cleat wrench. The cleat also has a ground-engaging spike 209 and a base 211 to which the skirt 203 and the spike 209 are attached. FIG. 22 is a side view of another cleat with a cleat connector similar to FIG. 21 showing an alternative ground-engaging "soft" golf spike 225. FIG. 23 is a top view of the cleat connector of the cleats in FIGS. 21 and 22 showing retaining member 213, which in this case is the base 211 with three thermoplastic extensions 215 projecting radially outward in a direction perpendicular to a vertical axis 210 of the base 211 in FIG. 21. Each extension 215 has a front side 217 approximately parallel to a radial midline 218 of the extension 215 and which extends from a radial end 220 of the extension 215 back towards the vertical axis 210 of the base 211. Each extension 215 also has a back side 219, roughly parallel to and substantially shorter than the front side 217; the back side 219 is also closer to the midline 218 of the extension 215 than the front side 217. The back side 219 extends back from the radial end of the extension 220, partway to the base 210 until it joins another surface 221 which is substantially perpendicular to the radial midline of the extension 218, so as to form an L-shaped indentation 222. In a preferred embodiment, the extensions 215 all lie in the same plane, and each extension 215 is equidistant from the adjacent extension.

Figure 24:
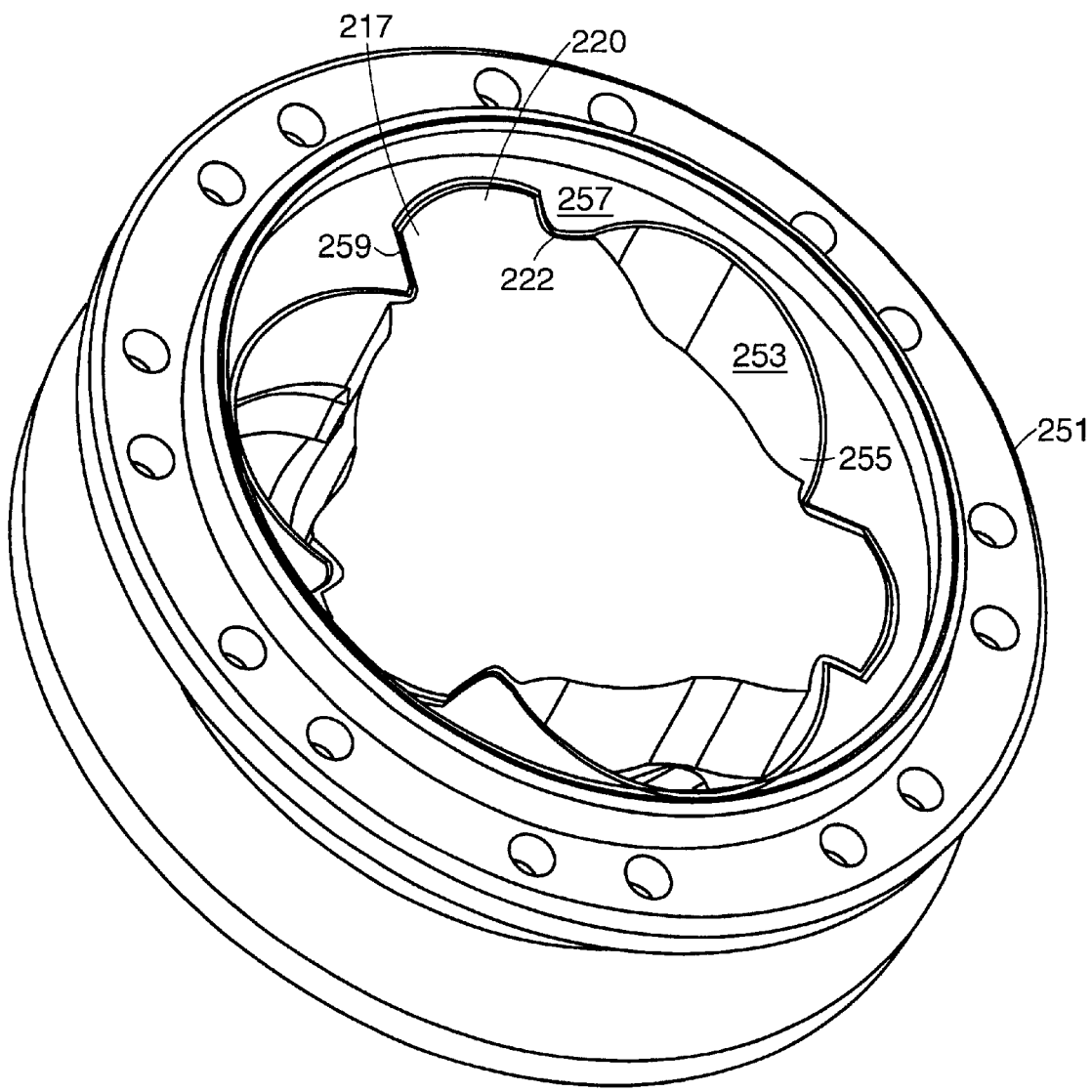
FIG. 24 is a perspective top view of the cleat of FIG. 21 in a receptacle with the top cover removed.

FIG. 24 is a perspective top view of a preferred embodiment of a receptacle 251 for receiving the cleats of FIGS. 21, 22, and 23 with the top cover removed to show the innercavity structure for receiving the retaining member, 213 in FIG. 23. Within a cavity 253, formed by wall portion 255, are several protuberances 257 designed to grip and hold an installed retaining member 213. When a retaining member 213 is inserted and twisted, the twisting action rotates the front side 217 of an extension 215 past a protuberance 257 so that the radial end 220 of the extension 215 compresses the protuberance 257, allowing the extension 215 to turn past the protuberance 257. The extension 215 can continue to rotate until the front side 217 of the extension 215 engages a stopping wall portion 259 of the cavity 253. The receptacle 250 is designed so when the front side 217 of an extension 215 engages a stopping wall portion 259 of the cavity 253, the protuberance 257 springs back to nearly its original shape and snugly engages the L-shaped indentation 222 on the back side 219 of the extension 215. Each extension 215 of an installed cleat, therefore, is firmly held in place between a stopping wall 259 and a protuberance 257 so that the retaining member 213 is securely attached to the receptacle 250.

Removal of the cleat requires rotation in the opposite direction from installation. In a preferred embodiment, the protuberances 257 and the radial ends 220 of the extensions 215 are shaped so that rotation of the cleat in the removing direction requires much greater torque than that required during installation. For example, the radial ends 220 of the extension 215 may be tapered on the front side, 223 in FIG. 23, so that the radial end more easily rides over and compresses the protuberance during installation. Without a taper on the back side 224 of the radial end of the extension 215, substantially greater force is required for the radial end 220 to ride over and compress the protuberance 257 when rotation is in the removing direction. Alternatively, the protuberances 257, rather than the extensions 215, may be tapered to allow easier rotation in the installation direction and require greater force for rotation in the removing direction.

The above description of the drawings provides details of several embodiments of the present invention. It is of course apparent that the present invention is not limited to the detailed description set forth above. Various changes and modifications of this invention as described will be apparent to those skilled in the art without departing from the spirit and scope of this invention as defined in the following claims.

What is claimed is:

1. A removable cleat for footwear comprising:

a gripping member for engaging the ground; and a retaining means for removably attaching the cleat to the footwear, the retaining means having a vertical axis, a base to which the gripping member is attached, and at least three extensions attached to the base;

wherein each extension projects radially outward from the base in a direction substantially perpendicular to the vertical axis; and wherein each extension has a front side and a back side, each side substantially parallel to a radial midline of the extension, the back side defining an indentation.

2. A cleat according to claim 1, wherein the gripping member comprises a metal core surrounded by a plastic outer layer.

3. A cleat according to claim 1, wherein the indentation is L-shaped.

4. A cleat according to claim 1, wherein the extensions are made of thermoplastic.

5. A cleat according to claim 1, wherein each extension is equidistant from the adjacent extensions.

6. A cleat according to claim 1, wherein the extensions are within the same plane.

7. A cleat according to claim 1, wherein the extensions are thinner on the front side than the back side.

8. A cleat according to claim 1, further comprising:

a skirt located between the gripping member and the retaining means base, the skirt extending radially outward beyond the radial ends of the extensions.

9. A cleat according to claim 8, wherein the skirt has on its lower side receptacles for a cleat wrench.

* * * * *